Nov. 30, 1926.　　　　　　　　　　　　　1,609,264
L. MELANOWSKI
MOTOR VEHICLE
Original Filed April 7, 1919　　4 Sheets-Sheet 1
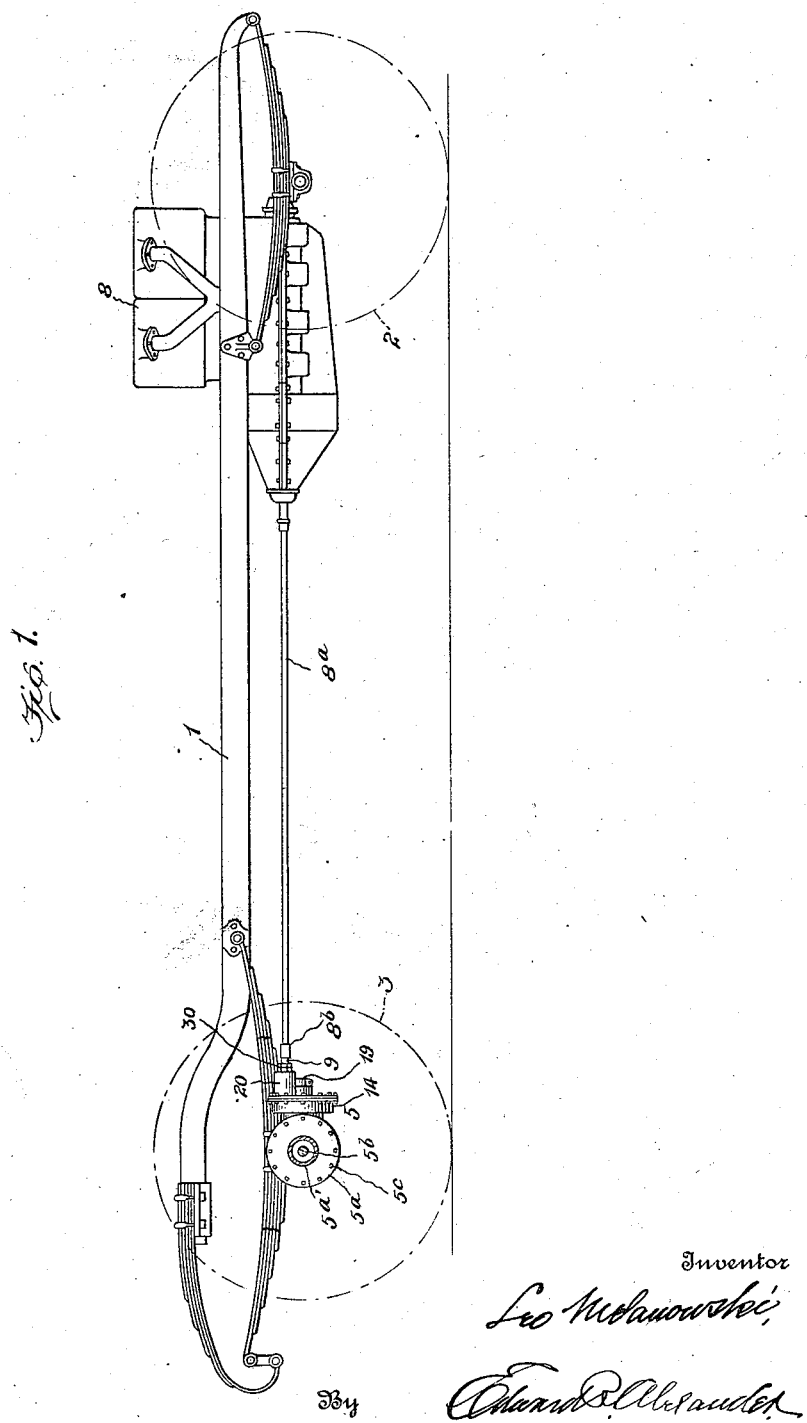

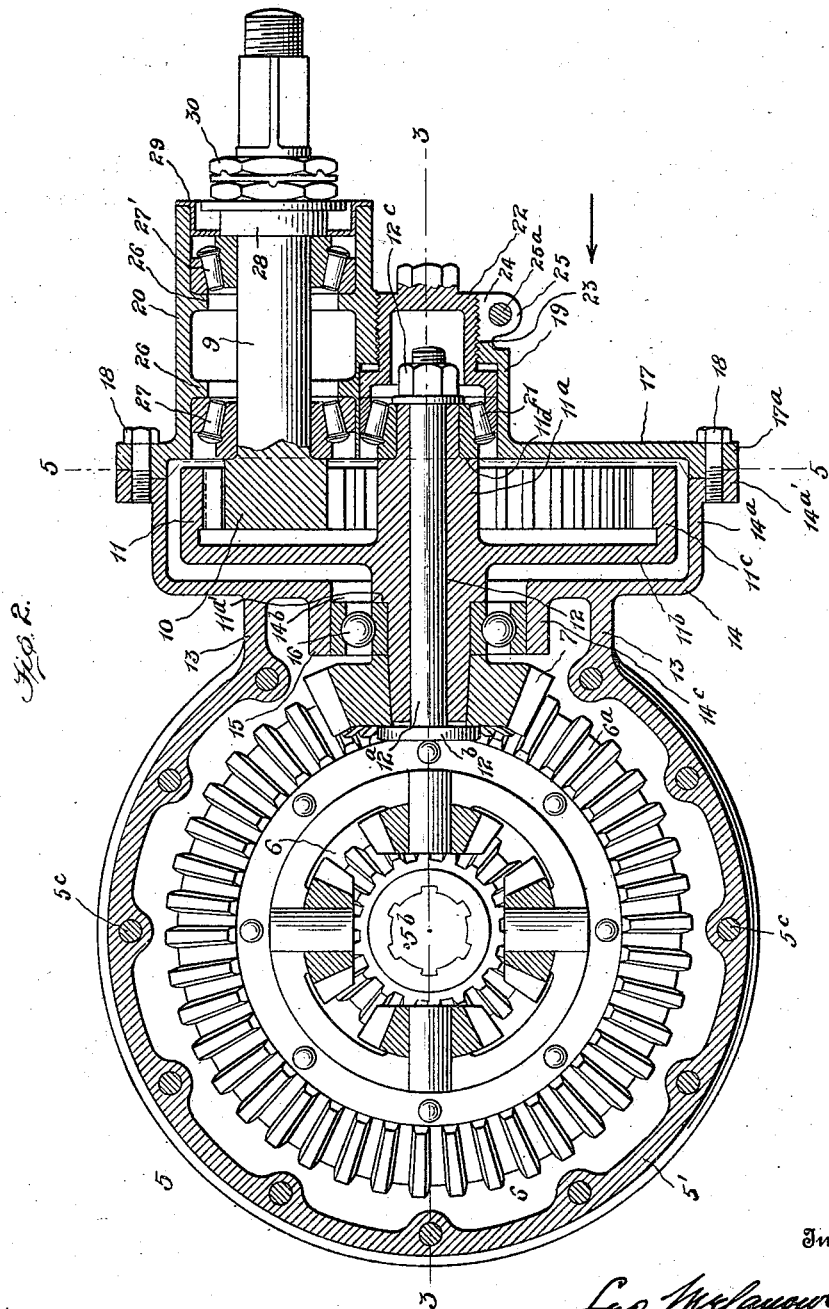

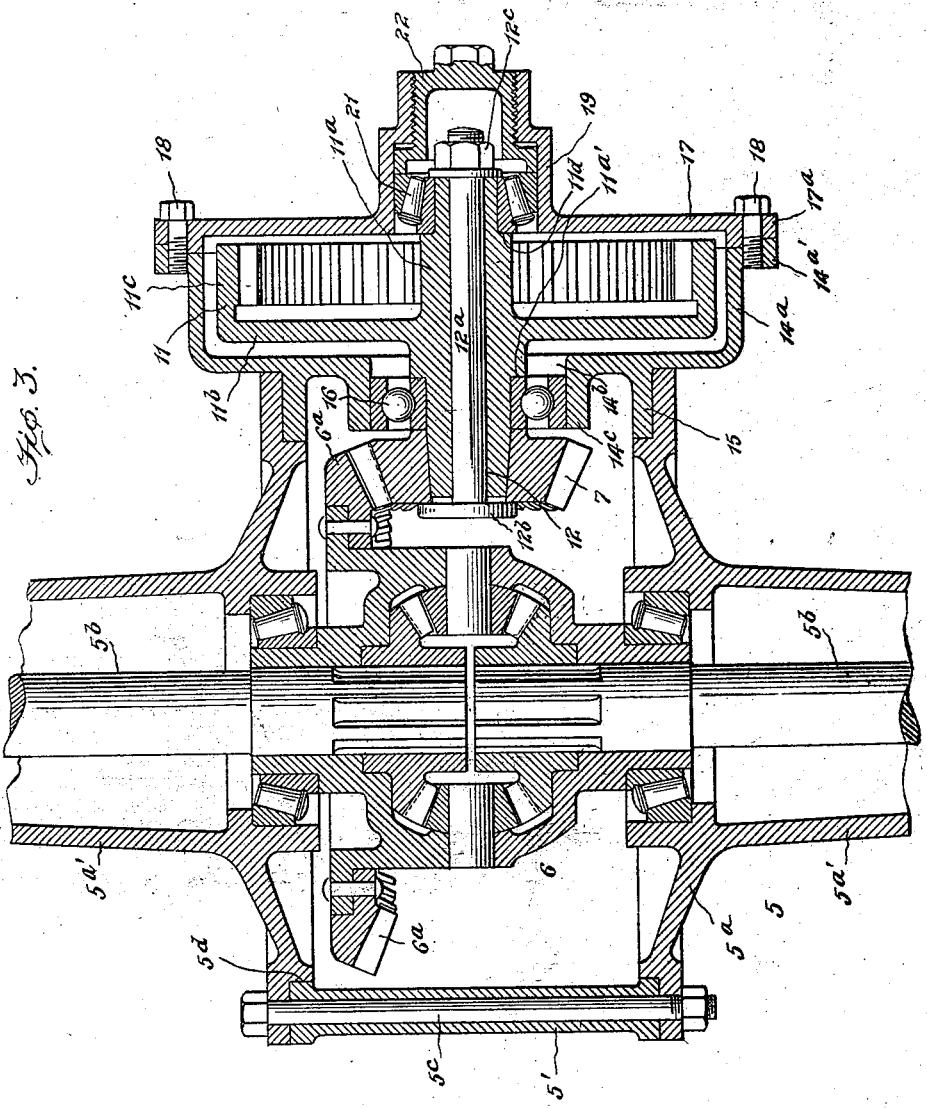

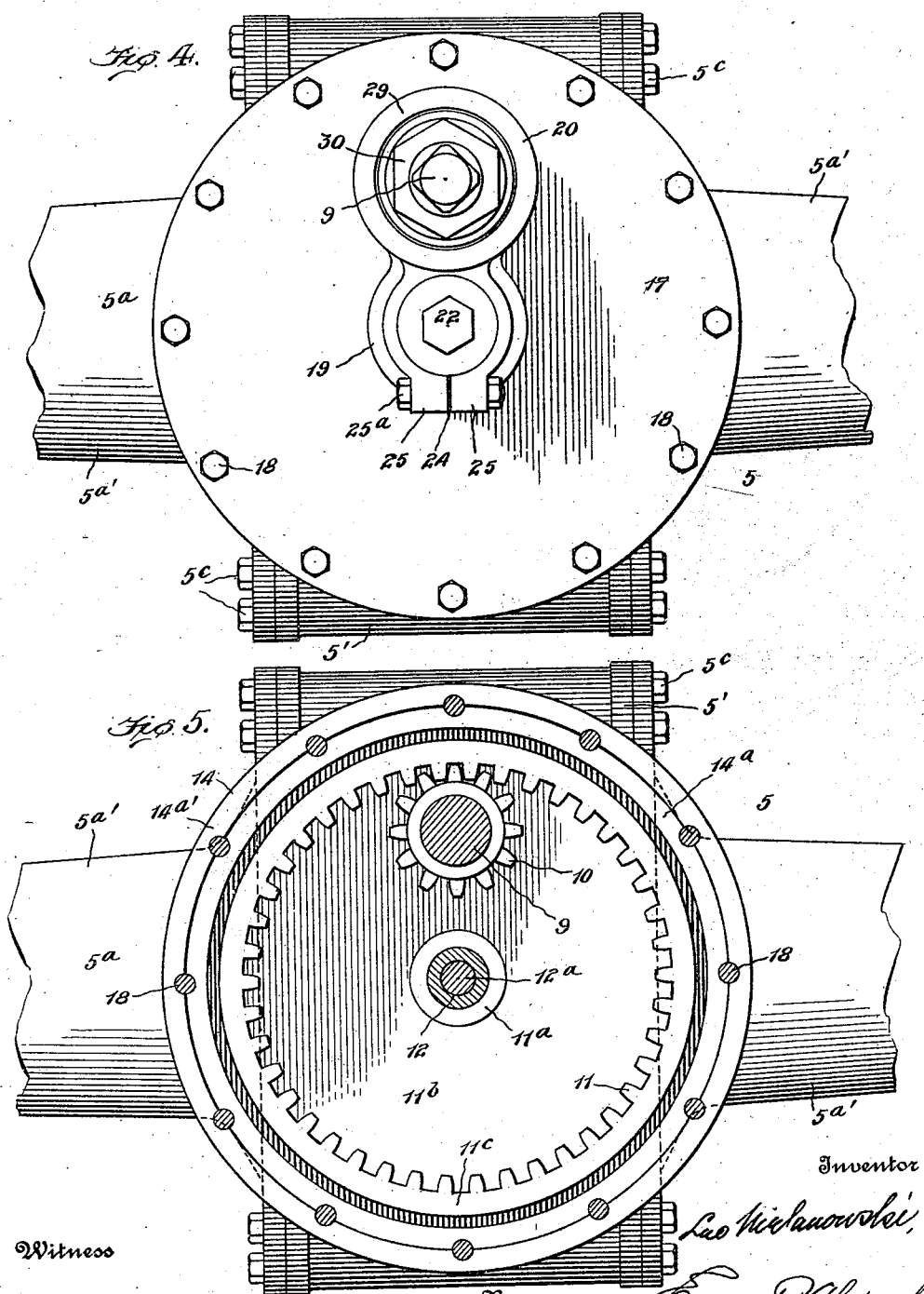

Patented Nov. 30, 1926.

1,609,264

UNITED STATES PATENT OFFICE.

LEO MELANOWSKI, OF CLEVELAND, OHIO, ASSIGNOR TO THE CITIZENS SAVINGS AND TRUST COMPANY, OPERATING TRUSTEE, OF CLEVELAND, OHIO, A CORPORATION OF OHIO.

MOTOR VEHICLE.

Application filed April 7, 1919, Serial No. 288,010. Renewed April 24, 1926.

This invention relates to motor vehicles, more particularly to the driving mechanism therefor.

One object of the invention is to simplify the construction of driving mechanism for motor vehicles.

Another object of the invention is to provide an improved driving mechanism, the elements of which are correlated to efficiently and economically transmit the power of the engine to the driven axle of the vehicle.

Another object of the invention is to provide an improved driving mechanism in which the proper speed reduction between the propeller shaft and the driven axle is secured in a simple manner.

These and other objects of the invention will be apparent to those skilled in the art from the following description.

For the purpose of illustration I have, in the accompanying drawings, shown and herein described one form of apparatus embodying my invention.

Referring to the drawings,

Fig. 1 is a side elevation of a motor vehicle chassis (the near front and rear wheels being omitted) having a driving mechanism embodying my invention.

Fig. 2 is a fragmentary sectional view substantially in the plane of the propeller shaft.

Fig. 3 is a section on line 3—3 of Fig. 2.

Fig. 4 is a view of the parts shown in Fig. 2, looking in the direction of the arrow.

Fig. 5 is a section on the line 5—5 of Fig. 2.

In the drawings, 1 indicates a frame of any desired construction. The frame 1 is mounted on front and rear wheels 2, 3, respectively (shown in dotted lines), the axle for the latter being indicated as an entirety at 5. The rear axle 5 preferably consists of a suitable housing $5^a$, preferably comprising tubular members $5^{a\prime}$ which enclose the rear live axle sections $5^b$, $5^b$, and an intermediate or central member $5'$, which co-operates with the tubular members to enclose a differential mechanism 6. The differential mechanism 6 may be of any desired construction.

8 indicates as an entirety the motor, preferably of the internal combustion type, mounted in any suitable manner upon the frame 1. $8^a$ indicates a propeller shaft connected at its front end to the shaft of the motor 8, or some element driven thereby, and connected at its rear end through a universal joint $8^b$ with a shaft 9.

10 indicates a pinion fixed in any well known manner to or formed integral with the rear end of the shaft 9. 11 indicates an internal gear in mesh with and arranged to be driven by the pinion 10. The internal gear preferably comprises a hub $11^a$, a plate $11^b$ and a flange $11^c$ on which the teeth of the gear may be provided, these parts being preferably formed integrally. The hub $11^a$ of the internal gear preferably extends in opposite directions to either side of the plate $11^b$ and serves as a shaft for the gear. The rear end of the hub $11^a$ is preferably tapered to receive a pinion 7, in mesh with the gear $6^a$ of the differential 6. The pinion 7 may be rigidly secured to the hub $11^a$ by the following means, which are shown merely for illustrative purposes: 12 indicates an opening extending axially through the hub $11^a$. $12^a$ indicates a rod extending through the opening 12. At its rear end the rod $12^a$ is formed with a head $12^b$ which engages the rear side or face of the pinion 7; at its opposite end the rod $12^a$ is provided with screw threads to take a nut $12^c$. When the nut $12^c$ is screwed up against the adjacent end of the hub $11^a$, it serves to draw the rod $12^a$ endwise and the latter acting through the head $12^b$ serves to force the pinion 7 against and maintain it in fixed engagement with the tapered walls at the rear end of the hub $11^a$. The nut $12^c$ may be locked in position in any suitable manner.

The inner ends of the tubular members $5^{a\prime}$ are connected to the central member or differential casing $5'$, by any suitable means, that shown comprising bolts and nuts $5^e$, the former extending through openings in the casing $5'$, as shown in Fig. 3. The inner end walls of the tubular members are preferably recessed at $5^d$ to receive the casing wall $5'$ and insure a dust proof and oil tight joint. At 13 the walls of the central member $5'$ are preferably extended forwardly. 14 indicates a plate connected, preferably integrally, to the walls 13 and co-operating with the walls of the housing $5^a$ to close the same for well known purposes. The plate 14 is preferably round and provided with a circumferential rim or wall $14^a$ to form a chamber for the internal gear 11. Between the walls 13 the plate 14 is preferably provided with rearwardly extending walls 15 which fit within seats formed in the adjacent end walls of the tubular members $5^{a\prime}$, $5^{a\prime}$. At $14^b$ the plate 14 is formed with an opening through which the hub $11^a$ extends. $14^c$ indicates a collar surrounding the opening $14^b$ and extending rearwardly of the plate 14. The collar $14^b$ forms a support for an anti-friction bearing 16, which may be of the annular type. The bearing 16 is preferably removably mounted in the collar $14^b$, but is normally held stationery therein by the hub $11^a$ to which the inner race is secured. For this purpose, the rear end of the hub $11^a$ is reduced to form a shoulder $11^{a\prime}$ against which the inner race of the bearing abuts. This race is held against the shoulder $11^{a\prime}$ by the pinion 7 and the securing means therefor.

17 indicates a cover or member which cooperates with wall $14^a$ to form a closed chamber for the internal gear 11. The member 17 may be provided with a flange $17^a$ which engages a flange $14^{a\prime}$ on the wall $14^a$. The flanges $14^{a\prime}$ and $17^a$ may be secured together by cap screws 18, or any other well known means.

19, 20, indicate extension members, preferably of tubular shape, extending forwardly from the front face of the member 17. The tubular extension 19 is arranged centrally of the member 17 and adapted to receive and support an anti-friction bearing 21 for the front end of the hub $11^a$. The inner race of the bearing 21 fits against a shoulder $11^d$ on the adjacent end of the hub $11^a$. The bearing 21 is preferably a tapered roller bearing to take the end thrusts of the hub $11^a$. 22 indicates an adjustable cap which fits within the tubular member 19, with its inner end in engagement with the outer race of the bearing 21. As the cap has screw-threaded engagement with the inner walls of the tubular extension 19, it can be operated to adjust the bearing 21 whenever that becomes necessary. At 23 the tubular extension is cut or split circumferentially and at 24 it is cut or split longitudinally to form a clamp collar and provided with lugs 25. The lugs 25 are formed with alined openings to receive a clamping device $25^a$, such as a bolt, having a nut which, when tightened, serves to operate the clamp collar and thereby lock the cap 22 against movement.

The tubular extension 20 is formed with internal ribs 26, 26, which form recesses or seats at the opposite ends of the extension for anti-friction bearings 27, 27′, preferably of the tapered roller type, for the shaft 9. The outer end of the tubular extension 20 is preferably closed by a collar 28, which is positioned against the inner race of the bearing 27′, and an annular member 29 secured to the outer end of the tubular extension 20, the collar 28 and member 29 co-operating to close in a dust proof manner the outer end of the extension. The collar may be held in position by locking devices of any suitable construction, indicated as an entirety at 30.

The tubular extension 20 is preferably arranged above and in a vertical plane cutting the axis of the hub $11^a$ so as to support the shaft 9 at the highest point. By this arrangement, I am enabled to arrange the shaft 9 horizontally and in substantially axial alignment with the axis of the shaft of the motor, so that the propeller shaft $8^a$ may extend horizontally in the axial line of the motor shaft and intermediate shaft 9 when the frame of the chassis and the axles for the wheels 2 and 3 are in normal relationship to each other. It is well known that in a construction wherein the motor transmits its power through elements to the driving pinion shaft, which are arranged at angles to each other, considerable loss of power results through friction created in the universal joints. By my construction I am enabled to correlate the motor shaft, the pinion carrying shaft 9 and the intermediate shaft $8^a$ in axial alignment with each other, when the chassis is standing still or running on a substantially level surface, thus reducing the friction and loss of power to a minimum.

Furthermore, by providing an internal gear type of construction between the propeller shaft $8^a$ or intermediate shaft 9 and the differential mechanism 6, I am enabled to utilize in an economical and efficient manner the maximum power of the propeller shaft $8^a$ to drive the vehicle. I am also enabled to provide, in a simple manner, a double reduction in speed between the propeller shaft and rear axle. The number of power transmitting elements required are relatively small, thus reducing to the minimum the number of supporting and thrust bearings and the cost of the mechanism as a whole.

My construction is relatively light and cheap to manufacture and the transmitting elements are enclosed in a tight casing to insure proper lubrication thereof. Furthermore, the construction of the casing is such as to permit ready accessibility to and adjustment of the power transmitting elements enclosed therein.

To those skilled in the art, many alterations in construction and widely differing embodiments and applications of my invention will suggest themselves, without departing from the spirit and scope thereof. My disclosures and the description herein are purely illustrative and are not intended to be in any sense limiting.

What I claim is:
1. In a motor vehicle, the combination of a rear axle housing, final drive mechanism, including a differential having a driven gear, a propeller shaft carrying a driving pinion, and a transmission member connecting said driving pinion and the driven gear of said differential, said member comprising an internal gear in mesh with said driving pinion and having a hub serving as a shaft for said internal gear, a pinion secured to said hub and arranged in mesh with said differential driven gear and anti-friction bearings carried by said housing for supporting the opposite ends of said hub.

2. In a motor vehicle, the combination of a rear axle casing, final drive mechanism, a differential therefor having a housing carrying a driven gear, a propeller shaft, an intermediate shaft connected to said propeller shaft and carrying a pinion, a transmission member connecting the pinion on said intermediate shaft and the said differential, said member comprising a gear in mesh with said pinion and a pinion in mesh with said differential driven gear, said rear axle casing comprising a wall having an opening to receive a bearing for one end of the shaft for said transmission member and a cover provided with a tubular extension to receive a thrust bearing for the opposite end of the shaft for said transmission member.

In testimony whereof I affix my signature.

LEO MELANOWSKI.